April 24, 1962   C. W. COLLINS   3,030,997
PLASTIC LOCKING NUT WITH SEALING FLANGE
Filed June 10, 1958   3 Sheets-Sheet 1

INVENTOR.
COY W. COLLINS
BY
ATTORNEY

April 24, 1962   C. W. COLLINS   3,030,997
PLASTIC LOCKING NUT WITH SEALING FLANGE
Filed June 10, 1958   3 Sheets-Sheet 2

INVENTOR.
COY W. COLLINS
BY
Malcolm W. Fraser
ATTORNEY

April 24, 1962

C. W. COLLINS 3,030,997

PLASTIC LOCKING NUT WITH SEALING FLANGE

Filed June 10, 1958

INVENTOR.
COY W. COLLINS
BY
*Malcolm W. Fraser*
ATTORNEY

United States Patent Office 3,030,997
Patented Apr. 24, 1962

3,030,997
PLASTIC LOCKING NUT WITH
SEALING FLANGE
Coy W. Collins, Toledo, Ohio, assignor to Prestole Corporation, Toledo, Ohio, a corporation of Michigan
Filed June 10, 1958, Ser. No. 741,037
1 Claim. (Cl. 151—7)

This invention relates to fastener units but more particularly to a non-metallic nut, and nut and washer unit.

An object is to produce a nut and washer unit of a suitable plastic or non-metallic material having the desired characteristics which not only effects a liquid-tight seal with the screw to which it is applied but also seals in a liquid-tight manner the surface against which it is tightened, automatically conforming to surface irregularities and additionally sealing the hole in the abutting surface through which the screw passes, the unit being such as effectively to resist vibration.

Another object is to produce a non-metallic nut in which the material has the desired characteristics including resilience and toughness, the same being self-threading or prethreaded and having the advantageous features of resistance to vibration and effecting liquid tight seal not only with the screw to which it is applied but also the screw aperture in the surface or panel through which the screw passes.

Other objects and advantages of the invention will hereinafter appear and for purposes of illustration but not of limitation, embodiments of the invention are shown on the accompanying drawings in which FIGURE 1 is a top plan view of a non-metallic nut and washer unit;

Figure 1:
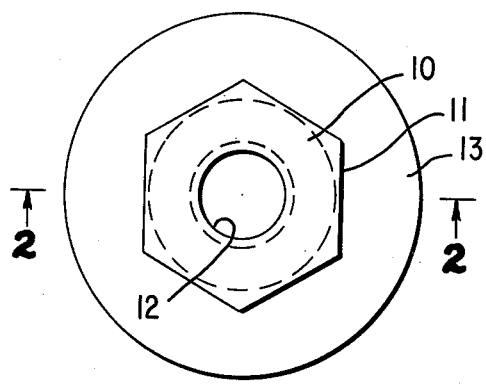
Figure 2:
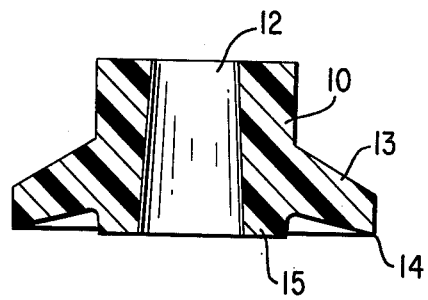
FIGURE 2 is a vertical sectional view substantially on the line 2—2 of FIGURE 1.
Figure 3:
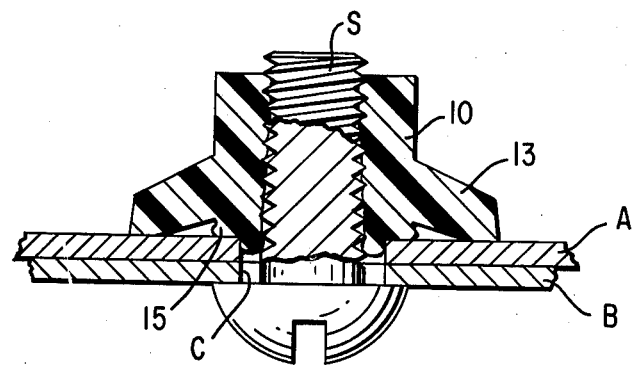
FIGURE 3 is a vertical sectional view of the nut, screw and panels, showing the manner in which the nut not only seals the thread of the screw, the holes in the panel through which the screw passes, but also the surrounding area.

The illustrated embodiment of the invention shown on FIGURES 1 to 3 comprises a nut and washer unit formed of one piece and of a suitable non-metallic material having the desired characteristics of deformability, toughness, resilience and resistance to cracking under stress. The non-metallic material or plastic may be for example nylon, polystyrene, molded fiber glass, rubber or neoprene. One specific plastic which has been found exceedingly satisfactory for the purpose is Zytel Nylon No. 101 sold by Du Pont de Nemours Company of Wilmington, Delaware, but this is not specified in any limiting sense.

As shown, the unit comprises a generally cylindrical body 10 which is formed on its upper portion with wrench-receiving flats 11 and a central hole 12 which is free of threads, it being understood that the metallic screw will force its own threads. Instead of flats, other tool engaging elements such as wrench-receiving slots, spanner holes or screw driver slots may be formed in desired locations. It will be noted that the screw-receiving hole 12 is tapered and is larger at the lower end than at the upper end, the lower end being the entering end for the screw. The smaller end of the taper of the hole 12 should not be less than the minor diameter of the screw employed and the larger end of the taper should be .003" to .005" larger than the maximum major diameter of the screw.

Integral with the body is an annular radially extending skirt or washer 13 which projects from the lower portion of the nut body, is of greater thickness at the inner end and gradually tapers to its outer end. As indicated, the skirt inclines both downwardly and outwardly terminating in an up and down edge, the lower edge of the skirt indicated at 14 being shown in this instance somewhat sharp.

Projecting from the nut body 10 beyond the inner portion of the skirt or washer 13 is a cylindrical extension 15, the outer surface of which is in this instance in the same plane as the outer surface of the main body of the nut and the same terminates at its outer end slightly beyond the peripheral lower edge 14 of the skirt.

FIGURE 3 shows the nut and washer unit applied to a screw for securing together a pair of flat panels A and B, which are provided with registering apertures C of somewhat greater diameter than that of the adjacent portion of the metallic screw S. The nut and washer unit is applied to the screw ordinarily or if desired the screw may be applied to the nut and washer unit. The tapered hole 12 enables the screw and nut to be readily assembled since the screw can enter the large end of the tapered hole 12 without difficulty. When applying the nut upon the screw, it will be manifest that the screw will force deeper grooves in the upper portion of the nut body than in the lower portion due to the tapered form of the hole. Due to the deformable characteristics of the material of the nut, a portion of the extension 15 is forced into a portion of the registering hole C as indicated on FIGURE 3. Also a portion of the extension 15 spreads laterally, thereby effectively to seal the hole as well as the surrounding area against the entrance of water or moisture.

When the skirt or washer portion 13 of the unit is pressed against the surface of the panel A, it effects a liquid sealing thereagainst regardless of irregularities on the panel. Pressure against the washer 13 causes it to exert a force inwardly and upwardly as a lever arm and causes the nut more intimately to engage the threads of the screw, thereby not only sealing the screw against the entrance of moisture but also tightening the nut against the screw so that loosening by vibration is virtually obviated. The extension 15 should not extend too far beyond the plane of the washer 13 because of the danger of compressing the body before any substantial pressure is imparted against the washer. Consequently the extension 15 may project only a slight distance beyond the plane of the pointed portion 14 of the washer substantially as shown on FIGURE 2.

It is found that a satisfactory structure is produced where the diameter of the washer base is approximately 40 to 50% greater than the diameter of the nut body, considering the nut body diameter to be the distance between the opposite points where adjacent wrench flats meet. By varying the thickness of the washer section, the outside diameter of the washer can be varied accordingly.

Figure 4:
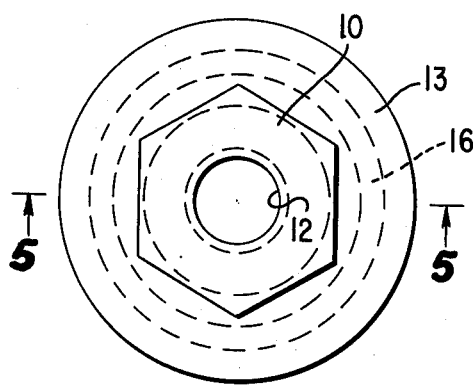
FIGURE 4 is a top plan view of an alternate form of non-metallic nut and washer unit provided with an annular rib on the underside of the washer portion.
Figure 5:
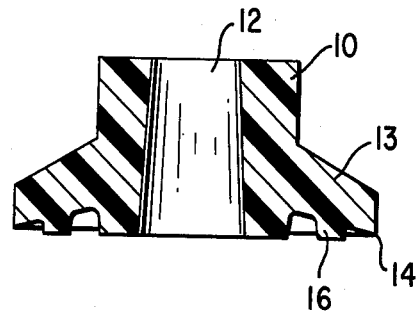
FIGURE 5 is a vertical sectional view substantially on the line 5—5 of FIGURE 4.

The alternate form as shown on FIGURES 4 and 5 is similar to that above described but is somewhat more desirable where higher tightening torque is required. In this instance an annular rib 16 depends from the underside of the washer between the nut body extension 15 and the outer edge portion 14 of the washer. The rib is integral with the washer and is of substantial thickness so that when it is forced against the adjacent panel surface, it will be flattened out to some extent and create a greater sealing and frictional contact with such surface. This obviates a difficulty which might be incurred in the form shown in FIGURES 1 to 3 where the greater tightening torque would result in undue curling of the edge portion of the washer to a point where the sealing action might be impaired.

FIGURES 6 to 9 show other forms of nut and washer units generally of the structure above described, an important difference residing in the screw-receiving central hole. The unit according to FIGURE 6 has a central hole in which the lower portion 18 is elongate and cylindrical and is of a diameter slightly greater than that of the screw for which it is intended. In this instance the cylindrical portion 18 extends a substantial distance into the nut body and then the hole is formed with an inwardly tapering portion 19 terminating in a small cylindrical hole 20 which is relatively short. This form is shown plain or untapped and is desirable where a quick lead is required, enabling the nut and screw to be readily applied, thus reducing the time necessary for fastening, such for example as in blind locations.

Figure 7:
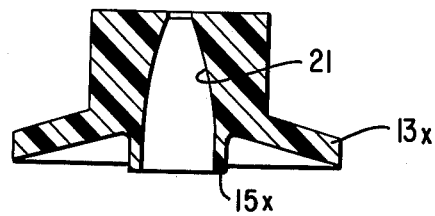

FIGURE 7 shows a unit in which the screw hole is wider at the bottom and tapers to a smaller upper end but the taper is not straight but curvilinear, the curve being a very gentle one. This form is useful where less torque is required, as for example in connection with aluminum studs.

Figure 8:
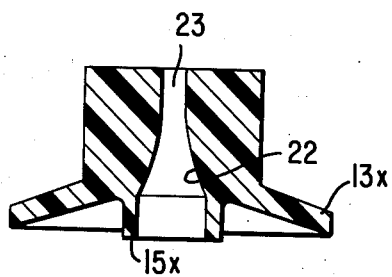

The unit according to FIGURE 8 has the lower portion of its screw hole tapered as indicated at 22. The upper portion 23 is of smaller diameter and cylindrical in form. The wider mouth enables ready application of the screw and nut and the screw will be embedded in a substantial portion of the nut to produce a relatively high tightening torque.

Figure 9:
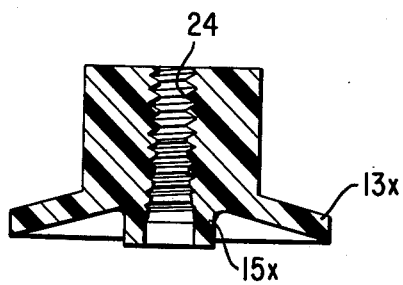

FIGURE 9 shows a tapered tapped hole so that instead of a tapered untapped hole as in FIGURE 2, for example, the hole may be tapped affording quicker application. The tapping may be such as to form threads adapted for a certain screw or if greater torque is desired, the tapping may be slightly undersize so that when applied the screw will force deeper threads. This may obtain in any of the forms described and in addition it may apply to a straight or untapered hole with beneficial results.

It should be observed in each of FIGURES 6 to 9 that the washer skirt 13 is of less thickness than that shown in FIGURES 1 to 5 and that the outer edge extends downwardly a greater distance beyond the nut body, thereby affording increased flexibility of the washer when forced against a panel surface. This indicates changes which can be effected in the thickness and arrangement of the washer, it being important that the washer have sufficient thickness so that it will press tightly in liquid sealing manner against the panel surface without curling upwardly when subjected to such pressure.

It should also be noted in FIGURES 6 to 9 that the body extension 15$^x$ is of less thickness than the extension 15 above described. In these forms the extension 15$^x$, due to its smaller outside diameter, deforms more readily under reduced pressure. Then, too, the extension 15$^x$ terminates in a plane above the lower rim of the washer so that the washer must first be forced against the panel surface before the extension 15$^x$ can be pressed into sealing contact with the panel hole and adjacent area.

Figure 10:
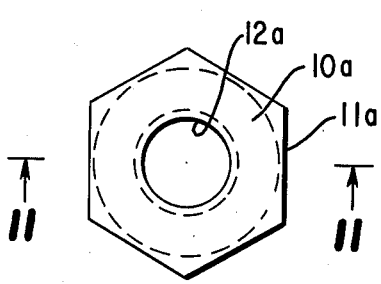
FIGURE 10 is a top plan view of a plain nut without the washer.
Figure 11:
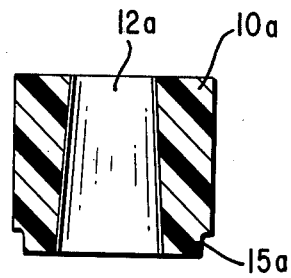
FIGURE 11 is a vertical sectional view on the line 11—11 of FIGURE 10.
Figure 6:
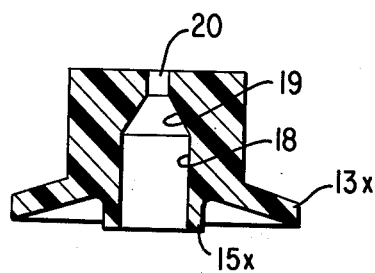
FIGURES 6 to 9 are vertical sectional views of nut and washer units showing different forms of screw-receiving holes and different forms of washer and sealing extension.

FIGURES 10 and 11 show a plain self-threading nut without any washer. In this instance the nut body is indicated at 10a and is generally cylindrical, being provided with wrench-receiving flats 11a throughout its length, there being a reduced extension 15a at the lower end which in use is forced into sealing engagement with the oversized hole through which the screw extends and also to seal adjacent portions of the panel in the region of the screw hole. The nut body is formed with a similar plain tapered hole 12a which is wider at the region of the extension 15a for reasons above pointed out.

Numerous changes in details of construction, arrangement and operation and choice of materials may be effected without departing from the spirit of the invention, especially as defined in the appended claim.

What I claim is:

A one piece nut and washer unit having a body of resilient, tough, deformable, non-metallic plastic material having a screw-receiving smooth walled hole through the center, an axial extension on the underside of said body adjacent the hole and coaxial therewith, a downwardly and outwardly inclined lever arm skirt integral with said body, and a rib portion formed integral with and depending from said skirt, both said extension and said rib portion extending axially beyond the outer edge of said skirt, said rib portion disposed intermediate the outer edge of said skirt and the center of said body and being only engageable with a supporting surface to which the nut is applied so that when the nut is tightened against the supporting surface, pressure against said rib portion of the washer imparts inward and upward flexure as a lever arm for causing the body more intimately to engage the threads of the applied screw.

References Cited in the file of this patent

UNITED STATES PATENTS

| | | |
|---|---|---|
| 1,875,930 | Martin | Sept. 6, 1932 |
| 2,706,656 | Roubal | Apr. 19, 1955 |
| 2,734,547 | Hotchkin | Feb. 14, 1956 |
| 2,761,349 | Heller | Sept. 4, 1956 |
| 2,788,829 | Edwards | Apr. 16, 1957 |

FOREIGN PATENTS

| | | |
|---|---|---|
| 1,062,703 | France | Sept. 4, 1952 |